(12) United States Patent
Grant et al.

(10) Patent No.: US 7,181,459 B2
(45) Date of Patent: Feb. 20, 2007

(54) METHOD OF CODING, CATEGORIZING, AND RETRIEVING NETWORK PAGES AND SITES

(75) Inventors: Lee H. Grant, Davis, CA (US); Susan A. Capizzi, Davis, CA (US)

(73) Assignee: Iconfind, Inc., Davis, CA (US)

( * ) Notice: Subject to any disclaimer, the term of this patent is extended or adjusted under 35 U.S.C. 154(b) by 380 days.

(21) Appl. No.: 10/082,596

(22) Filed: Feb. 22, 2002

(65) Prior Publication Data
US 2002/0087599 A1   Jul. 4, 2002

Related U.S. Application Data

(63) Continuation-in-part of application No. 09/565,695, filed on May 3, 2000, now abandoned.

(60) Provisional application No. 60/311,379, filed on Aug. 9, 2001, provisional application No. 60/271,041, filed on Feb. 23, 2001, provisional application No. 60/132,694, filed on May 4, 1999.

(51) Int. Cl.
*G06F 17/00* (2006.01)

(52) U.S. Cl. ......................................... 707/100; 707/10

(58) Field of Classification Search ............... 707/1, 707/7, 10, 100, 513, 104.1, 102, 9; 715/513, 715/526, 700
See application file for complete search history.

(56) References Cited

U.S. PATENT DOCUMENTS

| | | | | |
|---|---|---|---|---|
| 5,933,827 | A * | 8/1999 | Cole et al. | 707/10 |
| 5,987,457 | A * | 11/1999 | Ballard | 707/5 |
| 6,055,540 | A * | 4/2000 | Snow et al. | 707/103 R |
| 6,094,657 | A * | 7/2000 | Hailpern et al. | 707/103 R |
| 6,148,289 | A * | 11/2000 | Virdy | 705/1 |
| 6,385,602 | B1 * | 5/2002 | Tso et al. | 707/3 |
| 6,675,162 | B1 * | 1/2004 | Russell-Falla et al. | 707/5 |
| 6,691,105 | B1 * | 2/2004 | Virdy | 707/3 |
| 6,763,496 | B1 * | 7/2004 | Hennings et al. | 715/501.1 |

* cited by examiner

*Primary Examiner*—Greta Robinson
(74) *Attorney, Agent, or Firm*—Morrison & Foerster LLP

(57) ABSTRACT

The invention includes a method for categorizing pages on a network, including the steps of providing a list of categories and providing the opportunity to assign a page to one or more categories. The categories include pages involved in transacting business, pages involved in or providing information, subject matter categories, file-type categories, and copyright-status categories. The method also includes a categorization code that can be used to label a page with a categorization label indicating the categories to which the page is assigned. The invention also includes a method for searching for information on a network. The steps include providing an opportunity to limit a search to categories including commerce and information, subject matter, file type, and copyright status, and providing an opportunity to limit the search by keyword.

31 Claims, 9 Drawing Sheets

EDUCATION & SOCIAL SCIENCES

Adult education
Anthropology
Archeology
Colleges & universities
Dissertations
Economics
Folklore
Genealogy
History
Languages
Philosophy
Political Science
Psychology
Public & private schools
Religion
Research
Social issues
Statistics

SCIENCE & TECHNOLOGY

Aeronautics & space
Agriculture
Astronomy
Biology
Botany
Chemistry
Computers & Internet
Ecology
Electronics
Engineering
Geography (maps and atlases)
Mathematics
Oceanography
Paleontology & paleozoology
Physics
Technical processes
Technological advances
Weather
Zoology

SPORTS & RECREATION

Camping
Crafts
Food & cooking
Games & toys
Gardening
Hobbies
Home improvements
Pets
Sports (football, soccer,
  baseball, etc.)
Theme parks
Travel

ARTS & HUMANITIES

Architecture
Dance
Fine arts (painting,
  sculpture, etc.,)
Landscape architecture
Literature
Movies
Music
Performing arts
Photography
Television
Theater
Video

FIG. 6

METHOD OF CODING, CATEGORIZING, AND RETRIEVING NETWORK PAGES AND SITES

RELATED APPLICATIONS

Pursuant to 37 C.F.R. section 1.53(b)(2), this application is a continuation-in-part application that claims the benefit of the filing date earlier-filed, nonprovisional application Ser. No. 09/565,695 filed on May 3, 2000, now abandoned which claims the benefit of the filing date of earlier-filed provisional application Ser. No. 60/132,694 filed on May 4, 1999.

This application claims the benefit of the filing date of earlier-filed provisional application Ser. Nos. 60/271,041 filed on Feb. 23, 2001 and 60/311,379 filed on Aug. 9, 2001, pursuant to 35 U.S.C. section 119(e).

BACKGROUND OF THE INVENTION

1. Field of the Invention

The present invention relates generally to methods for categorizing and searching for information on a network and, more specifically, to categorizing and searching Web pages on the Internet.

2. Description of the Related Art

The Internet contains over two billion Web pages. It has been estimated that two million Web pages are added to the Internet each day (*The Industry Standard*, Feb. 28, 2000). This vast amount of information is a tremendous resource for the public to use. However, there is no effective way for a user to obtain relevant information. Although 85 percent of users use search engines to find information on the Internet, "a mind-boggling 92 percent of searches fail to find relevant information or to arrange the results in a meaningful order." (*The Industry Standard*, Apr. 17, 2000, referring to a Forrester Research review of Web sites.)

There are two fundamental problems. First, there is no standardized international categorization system or catalog of the information contained on the Internet. A group of librarians and others have been working on a cataloging system for the Internet for the last few years. This work is referred to as the Dublin Core Metadata Element Set. This system suffers from a number of problems, including requiring a high degree of cataloging knowledge and being time-consuming and very expensive. In addition, because of the size of the Internet, it is a system that is unworkable.

Second, because there is no standardized categorization system or catalog, the existing search methods, which primarily include directories and search engines, are often cumbersome, ineffective, and inefficient.

Directories or indices are human-compiled databases of Web sites or pages. Most directories use editors to review and categorize Web sites. Some use contributions by their visitors. A user searches a directory by reviewing lists of categories and subcategories, or also typing in keywords. The result is a list of documents that the user can access by links. Directories are helpful to familiarize a user with the scope of a subject, but are not very useful in finding specific information. Also, directories can be slow, and the results may be haphazard. Another major problem is that directories review and categorize only a small percentage of pages and sites. Examples of directories commonly used are Yahoo! and LookSmart.

Search engines are huge databases that automatically index large portions of the Internet and continually update that index. Search engines typically include a Web crawler or spider (also called a worm, robot, or bot) that automatically crawls through the Internet on hyperlinks indexing Web pages, a database which is the index compiled by the crawler, and a search tool which the user can use to search the database. The databases of the existing search engines differ in how they are created. Some Web crawlers index each word in a document, some index only keywords, including META tags, and some index other parts of a Web page, such as title, headings, etc. Most search engines require a search to be conducted by typing in keywords. The way in which the search query is formulated may be by Boolean logic, where keywords are used with various terms, or by natural language, where keywords are used in the form of a question. Although natural language searches may be easier for a user to formulate, both types of formulations rely on keywords.

Most search engines use mathematical algorithms to weigh or rank the results, with the most relevant items listed first. These rankings may be based on the number of times a keyword is used on a page or the location of the keyword on the page. Some search engines also allow the user to organize or group the results by category, date, or other variable, such as the folders used by Northern Light, U.S. Pat. No. 5,924,090 to Krellenstein. Another search engine, known as the Clever Project, by IBM, analyzes hyperlinks between pages, in addition to text and citations, in order to develop algorithms that are intended to increase the relevancy of search results. This method is a marginal improvement over other search engines, but has its own set of problems. "A shortcoming of Clever has been that for a narrow topic, such as Frank Lloyd Wright's house Fallingwater, the system sometimes broadens its search and retrieves information on a general subject, such as American architecture." ("Hypersearching the Web," *Scientific American,* June 1999.)

Search engines do not index the entire Internet. Most have indexed about one-third of the available or publicly indexable Web pages (i.e., excluding Web pages with authorization requirements). Examples of search engines are Google, FAST, AltaVista, Inktomi, and Northern Light. A greater portion of the Internet can be searched using a meta-search. This technology allows the user to search several search engines at the same time and presents all the results in a single list, but exacerbates the problems inherent in existing search engines.

Because they contain such huge databases, existing search engines often produce search results too voluminous for the user to review. Also, the search results typically contain a vast amount of irrelevant or unrelated items. As stated previously, it has been found that 92 percent of searches did not yield relevant information or did not organize the results in a usable fashion (*The Industry Standard,* Apr. 17, 2000). Another problem is that search engines are more likely to index pages with more links, pages with commercial information, and pages in the United States, rather than lesser known, educational, or non-United States pages.

Another major problem of existing search engines is that they may allow minors access to pornography on the Internet. Current filtering software is an ineffective and often clumsy tool that fails to limit access to many pornographic sites, but blocks other sites that are educational or medical in nature. In addition, the controversy surrounding this issue has created enormous difficulties for public institutions, such as schools and libraries, with respect to allowing minors access to the Internet.

Lastly, it is often difficult for a user to determine the copyright status of material on the Internet. There is also no easy way for owners of content to indicate the copyright status of their material. This problem has hampered the flow of information and left both the owners of content and users confused and potentially in legal jeopardy.

SUMMARY OF THE INVENTION

The method for categorizing and retrieving network pages and sites of the present invention are adapted to overcome the above-noted shortcomings and to fulfill the stated needs.

The first embodiment of the invention is a method for categorizing a network page. The method comprises the steps of providing a list of categories and providing the opportunity to assign a page to one or more of a plurality of the categories. The categories include whether a page is involved in transacting business or providing information, whether a page has information relating to one or more of a plurality of subject matter categories, the type of files associated with a page, and the copyright status of the material on a page. The method also includes a categorization code.

The second embodiment of the invention is a method for searching for and locating information on a network. The method comprises the steps of providing the opportunity to limit the search to categories for pages involved in transacting business, pages involved in providing information, and pages involved in both transacting business and providing information; providing an opportunity to limit the search to one or more of a plurality of subject matter categories; providing an opportunity to limit the search to one or more of a plurality of file-type categories; providing an opportunity to limit the search by keyword; and providing the opportunity to limit the search to one of a plurality of copyright-status categories.

It is an object of the invention to provide a method for categorizing a page on a network, during or after the time that the page is created, according to whether the page is involved in transacting business or providing information.

It is an object of the invention to provide a method for categorizing a page on a network, during or after the time that the page is created, according to the subject matter contained on the page.

It is a further object of the invention to provide a method for categorizing a page on a network, during or after the time that the page is created, according to the type of files associated with the page.

It is also an object of the invention to provide a method for categorizing a page on a network, during or after the time that the page is created, according to the copyright status of the material on the page.

It is an object of the invention to provide a method for searching a network, such as the Internet, to allow the user access to a larger percentage of information contained on the network.

It is a further object of the invention to provide a method for searching a network, such as the Internet, to obtain more relevant results more quickly than existing methods for searching allow.

It is a further object of the invention to provide a method to easily obtain audio or visual material located on a network.

It is also an object of the invention to provide a method to easily retrieve material of a particular copyright status located on a network.

It is another object of the invention to provide a method for searching a network that is easy to use.

It is also an object of the invention to provide a method that does not require the user to understand or use a particular language, including English.

It is a further object of the invention to provide a method for limiting the results of a search, such as a search on the Internet, to exclude pornographic materials.

It is also an object of the invention to provide a method with the advantages of pornography-filtering software, but without the disadvantages of such software.

BRIEF DESCRIPTION OF THE DRAWINGS

FIG. 6 is a chart of the Education & Social Sciences, Science & Technology, Sports & Recreation, and Arts & Humanities categories of the second tier showing examples of topics contained within those categories.

DESCRIPTION OF THE PREFERRED EMBODIMENTS

The invention includes methods for categorizing a page as it is being created or as it exists on a network, and for searching a network. Networks include the Internet and private corporate networks, such as intranets and local area networks. Pages on the Internet are identifiable by unique addresses and include both Web sites and Web pages.

Figure 1:
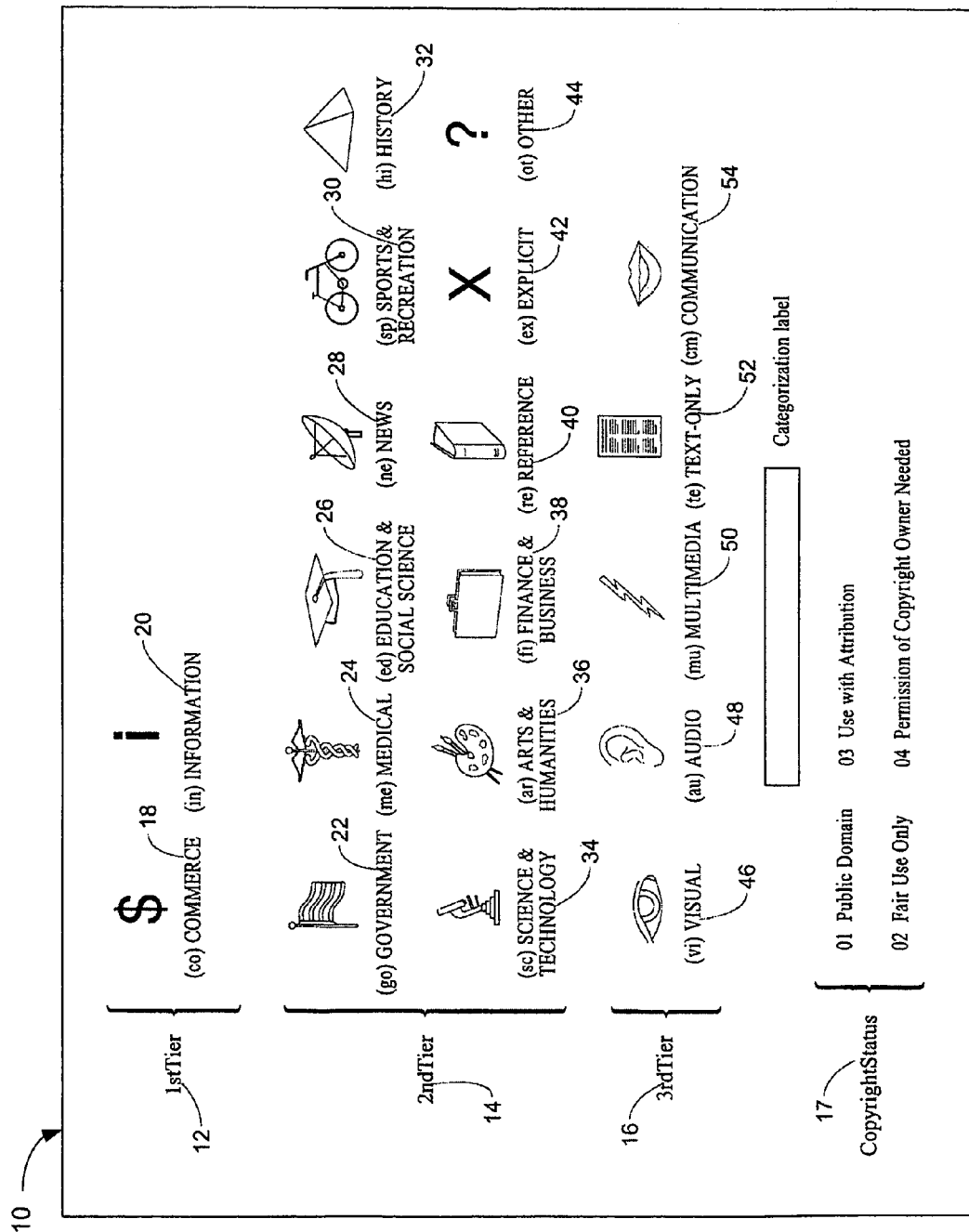
FIG. 1 is a representation of the preferred graphical user interface used for categorizing, showing the three tiers and the categories within those tiers, and the copyright-status categories.

The invention includes a hierarchy of three tiers 12, 14, and 16, and a set of copyright-status categories 17, to categorize, and to search for information located on, Web pages. The invention may utilize a graphical user interface (GUI), although it is not necessary. FIG. 1 shows an example of the invention utilizing GUI 10. Other versions of GUI may also be used and not all tiers or categories need be used. The GUI may show only tiers 12, 14, and 16, only the copyright-status categories 17, or any combination of categories.

First tier 12 is a division into one or both of two major categories: pages that are involved in transacting business and pages that are involved in providing information. In the preferred embodiment of the invention, the first category 18 is designated "Commerce" and the second category 20 is designated "Information." Web pages involved in transacting business include e-commerce pages, which provide users with the ability to conduct online purchases, sales, leases, or other financial transactions, pages that may be involved in transacting business, but do not enable the user to conduct the transaction on-line, and other pages that contain commercial information. Web pages involved in providing information include pages that contain articles, journals, publications, or other non-commercial materials. Some Web pages may be involved in both transacting business and providing information and thereby fall within both the categories of "Commerce" and "Information."

Figure 5:
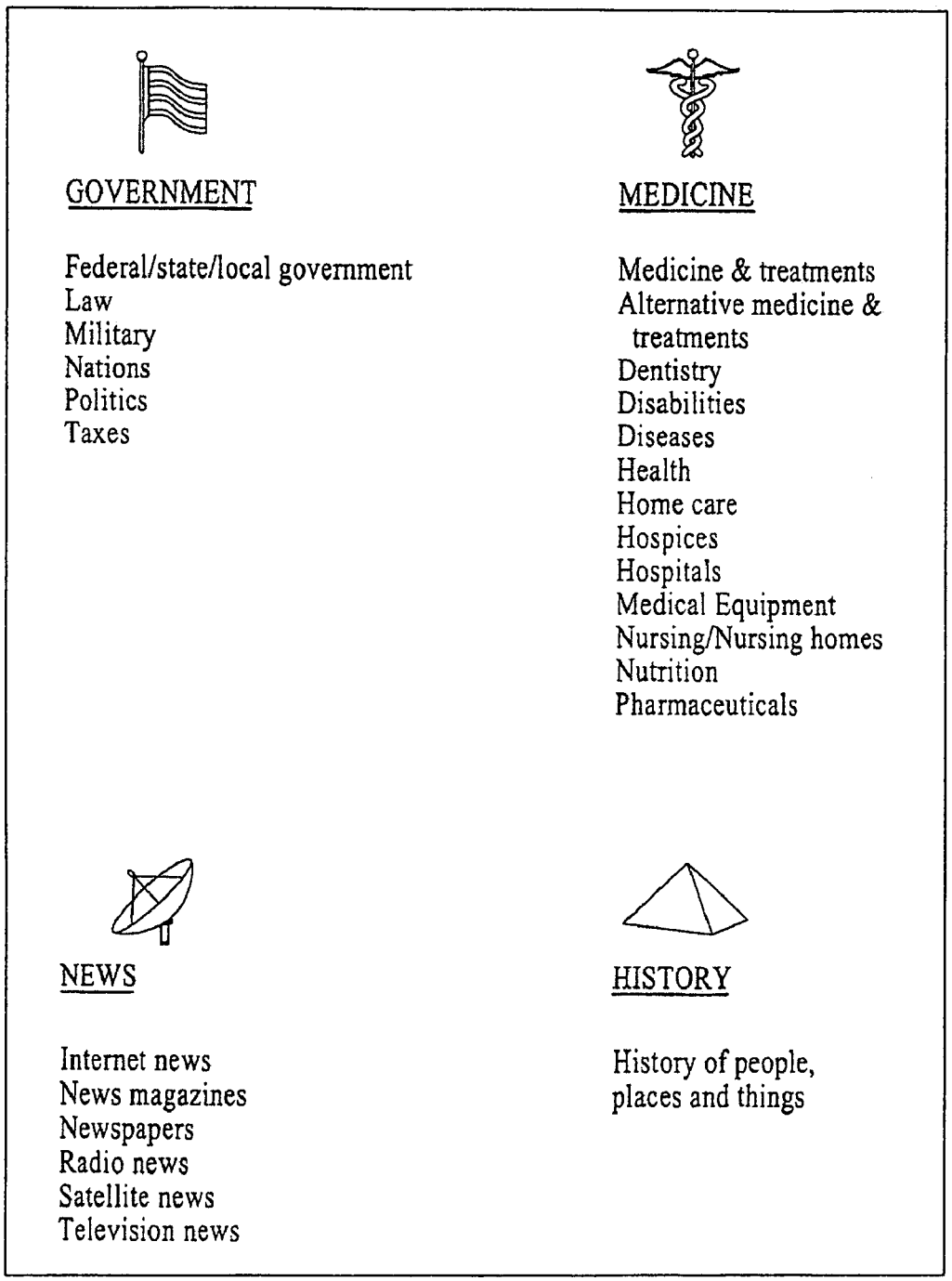
FIG. 5 is a chart of the Government, Medical, News, and History categories of the second tier showing examples of topics contained within those categories.
Figure 7:
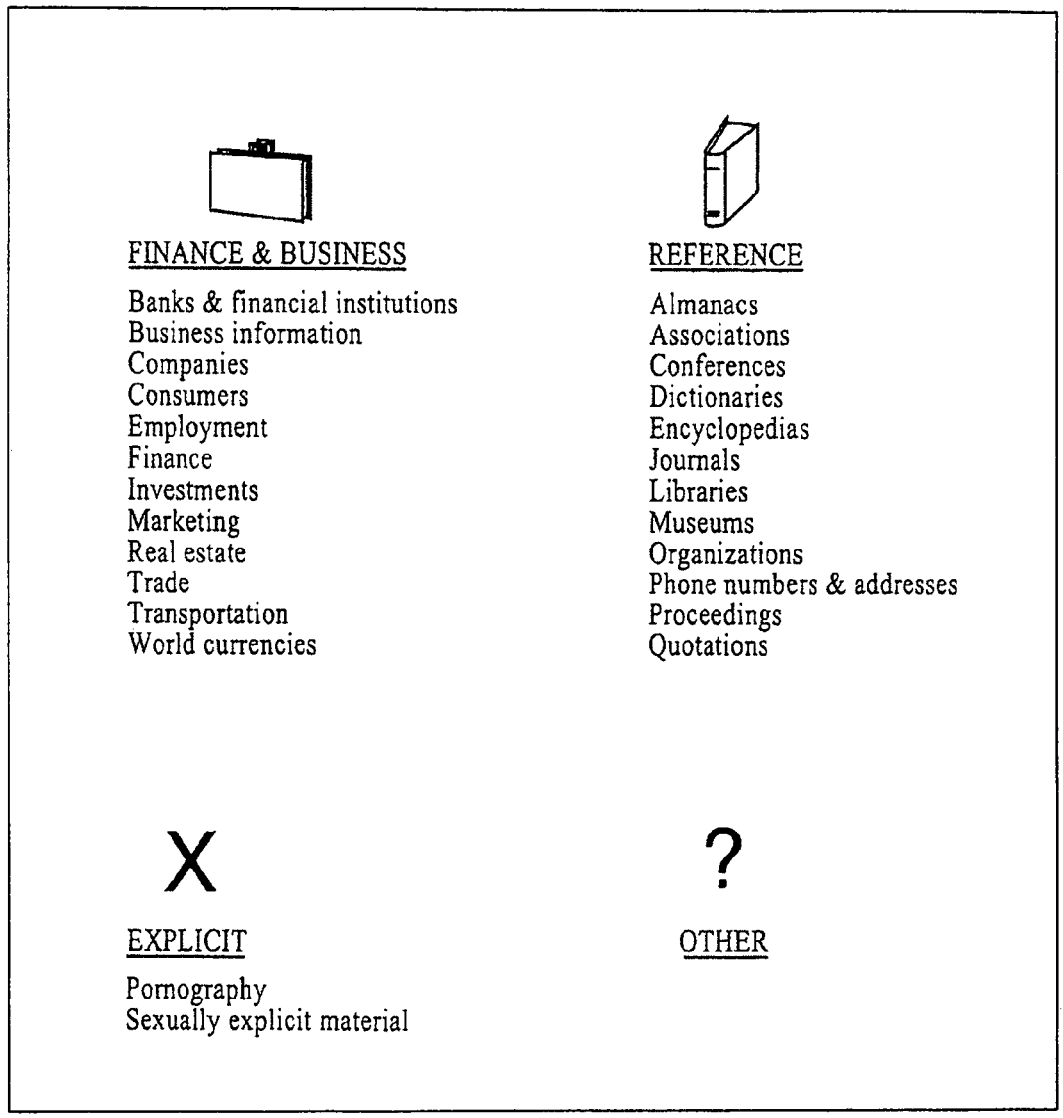
FIG. 7 is a chart of the Finance & Business, Reference, Explicit, and Other categories of the second tier showing examples of topics contained within those categories.

Second tier 14 is a division into one or more categories based on the subject matter the Web page contains. Many different categories can be used and many different terms may be used to identify a given category. The preferred embodiment of the invention includes twelve categories encompassing like subjects that have been carefully selected to allow users to locate and access information in an efficient manner: Government 22, Medical 24, Education & Social Science 26, News 28, Sports & Recreation 30, History 32, Science & Technology 34, Arts & Humanities 36, Finance & Business 38, Reference 40, Explicit 42, and Other 44. Each of these categories includes many topics. FIGS. 5, 6, and 7 list examples of the topics included in each category. For example, category 22, Government, includes the following topics: federal/state/local government, law, military, nations, politics, and taxes. Category 42, Explicit, includes pornography and sexually-explicit material. Category 44, Other, is for subjects that do not fit into any of the other categories of second tier 14.

Third tier 16 is a division into one or more categories according to the type of files associated with a Web page. There are several different types of files, including text, graphics, audio, video, multimedia, and files for communications between persons. Most search engines can recognize the type of files associated with a Web page by scanning the files and identifying the file extensions (for example, gif, .au, .wav). The preferred embodiment of the invention includes the following five file-type categories: Visual 46, Audio 48, Multimedia 50, Text-only 52, and Communication 54. Category 46, Visual, includes files containing pictures, charts, graphs, and diagrams. Category 48, Audio, includes files containing sound, such as music, voice, and sound effects. Category 50, Multimedia, includes files containing video, film clips, and virtual reality. Category 52, Text-only, includes files that do not contain any visual, audio, or multimedia material. Category 54, Communication, includes files containing e-mail, telnet links, ICQ, and other messaging systems.

The set of copyright-status categories 17 includes the following four categories. Public Domain is material that is in the public domain and can be used freely without any restrictions. Fair Use Only is material meant to be used in accordance with accepted fair use guidelines. Use with Attribution is material that can be used as long as its use is accompanied by an attribution to the author or copyright owner. Permission of Copyright Owner Needed is material that cannot be used unless the copyright owner is first contacted for permission, which may or may not be granted and may include fees and additional terms.

Method For Categorizing a Page

The first embodiment of the invention is a method for categorizing a page on a network, as the page is being created or during editing at a later time. The method includes the steps of providing the creator with a list of categories and providing the creator an opportunity to assign the page to one or more of the categories. The preferred categories are the categories of the three tiers 12, 14, and 16, and the categories for copyright status 17, as shown in FIG. 1. The list of categories includes at least one different indicium for each category. The indicium is preferably a universal symbol or icon that is not associated with any one language, but it may also include a combination of letters, numerals, or other characters, or symbols. The indicia preferably used are universal icons and two-letter or two-numeral indicia, as shown in FIG. 1. Thus, the indicia for commerce are "co" and the "$" symbol, while the indicium for "Public Domain" is "01."

The creator of a Web page may assign the Web page to any number or combination of the categories of three tiers 12, 14, and 16, and one of the copyright-status categories 17, depending on which categories best characterize the Web page. The steps of assigning a page to categories may be performed in several different ways known to those skilled in the art. The creator may also decide not to assign the page to any of the categories of a particular tier. The creator may assign the page to one of the copyright-status 17 categories with or without also assigning the page to any of the categories of three tiers 12, 14, and 16. Thus, the copyright-status categories 17 can be used in connection with the categories of some or all of three tiers 12, 14, and 16, alone, or not at all. The outcome of the categorization method is that a page is designated to be "in" or "within" the categories that best characterize the page.

First tier 12 includes two categories: Commerce 18 and Information 20, as shown in FIG. 1. The creator may assign the page to either one of the two categories of Commerce 18 or Information 20. If the page is involved in both transacting business and providing information, the creator may assign it to both Commerce 18 and Information 20.

Second tier 14 includes twelve subject matter categories: Government 22, Medical 24, Education & Social Science 26, News 28, Sports & Recreation 30, History 32, Science & Technology 34, Arts & Humanities 36, Financial 38, Reference 40, Explicit 42, and Other 44, as shown on FIG. 1. The creator may assign the page to one or more of these twelve categories.

Third tier 16 includes five file-type categories: Visual 46, Audio 48, Multimedia 50, Text-only 52, and Communication 54, as shown in FIG. 1. The creator may assign the page to one or more of the five file-type categories.

The copyright-status categories 17 include four categories: Public Domain, Fair Use Only, Use with Attribution, and Permission of Copyright Owner Needed. The creator may assign the page to one of the four copyright-status categories.

After the creator decides to which categories to assign the page, the creator may mark or tag the page as belonging in or within the assigned categories by associating, with the page, the corresponding indicium for each assigned category. In addition, or alternatively, the creator may communicate the categories to which the page is assigned to one or more search engines for the purpose of allowing such search engines to locate or recognize the page, by its assigned categories, in conducting a search. The creator may change the categories during editing at a later point in time as frequently as desired.

Categorization Code

The method also includes the step of providing the creator with a categorization code that can be used to tag or label each page or site. The categorization code preferably works with any Internet language (such as html, xml, and vrml) and can be used without any programming skills and is preferably the indicia shown in FIG. 1. Using the categorization code, the creator can assign a categorization label to each page. The categorization label preferably consists of the indicia for all of the categories to which the page is assigned. An example of such a categorization label is a single, simple character string consisting of the two-letter or two-numeral indicia for all of the categories to which the page is assigned. The categorization label for a page preferably also includes an identifier, such as a combination of several characters or symbols, to indicate that the characters or symbols that follow are part of a categorization code system.

To use the categorization code, the creator selects the indicia from all three tiers and the copyright-status categories that are relevant to the content of the page being categorized. The indicia for the categories are preferably placed in an unbroken code string in the following order: first tier, second tier, third tier, and copyright-status categories. This code string is the categorization label for the page. The categorization label can either be typed directly onto the page or created by clicking on the icons of the user interface which will allow the categorization label to be copied and pasted on the page. If a user interface is used, the icons that have been selected may be indicated by a change in color, brightness, or shading, or in some other manner. The categorization label is preferably placed at the bottom or end of the page.

Figure 2:
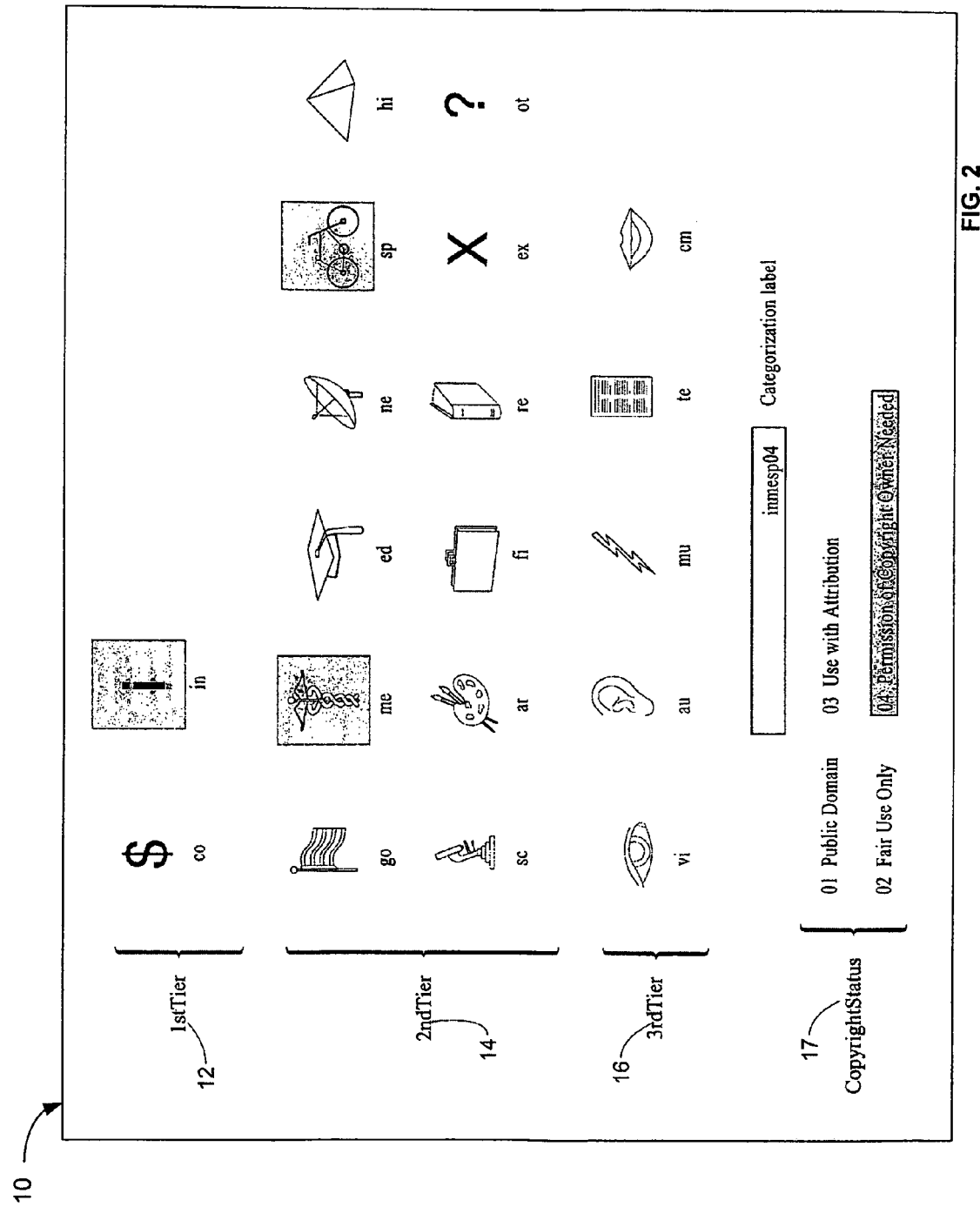
FIG. 2 shows an example of the preferred graphical user interface for a page having the categorization label "inmesp04."

The categorization label will be readable by Web crawlers and may be visible to users. For example, a page that contains scientific information with pictures would be categorization labeled as "inscvi," which indicates: Information (in); Science & Technology (sc); and Visual (vi). By selecting one of the four copyright-status indicia and placing it on the end of the categorization label, the creator adds the information governing the use of the material. For instance, if the creator wants to inform viewers that the page is available for use as long as an attribution is included, "03" would be added to the end of the categorization label. The categorization label would be "inscvi03," which indicates: Information (in); Science & Technology (sc); Visual (vi); and Use with Attribution (03). If a page contains information about treating sports injuries and the creator wants to inform viewers that permission from the copyright owner is needed, then the categorization label would be "inmesp04," which indicates: Information (in); Medical (me); Sports & Recreation (sp); and Permission of Copyright Owner Needed (04). FIG. 2 is an example of a user interface showing the categorization label "inmesp04."

A page that offers access to pornographic pictures and movies for a fee would have a categorization label that included the indicia for Commerce, Explicit, Visual, and Multimedia. The categorization label would be "coexvimu," which indicates: Commerce (co); Explicit (ex); Visual (vi); and Multimedia (mu). The Explicit category 42, identified by the "X" icon and the "ex" code, can be refined into subcategories through the use of first tier 12 and third tier 16. The Explicit category 42 is not combinable with other categories of second tier 14, however, because it is intended that the Explicit category 42 be restricted to pornographic materials. Other types of sexually explicit material, which may be appeared in information related to medical studies and scientific research, and material related to pornography which may be appeared in information related to governmental initiatives and news, may be accessed through the other categories of second tier 14 using "pornography" as a keyword.

The categories of the three tiers 12, 14, and 16 and the copyright-status categories 17 may be used individually or together in any combination. The creator may or may not choose to include the copyright-status categories. Likewise, if the primary interest is in placing the copyright status on the page or site, then the three tiers 12, 14, and 16 need not be included. If no categories are chosen from the first, second, or third tiers, then the categorization label would include only the copyright status; for example, a categorization label of "04" indicates Permission of Copyright Owner Needed.

The copyright-status indicia may also be linked to additional information or definitions pertaining to the copyright status. For example, "01" may also include a definition of public domain, "02" may also include a definition of fair use, "03" may also include instructions on how to show attribution, and "04" may also include instructions on how to contact the copyright owner and required terms.

Categorization Label for the Entire Site or Portion Thereof

The categorization label for a single page can be made to apply to the entire site or a portion thereof with the addition of a character or symbol, such as an exclamation point, "!," at the end of the categorization label. When added to the categorization label, the exclamation point makes the categorization label the default code for the remainder of the site that contains the same root URL from where the categorization label containing the exclamation point is placed.

If the exclamation point is placed on the categorization label for the index, home, or default page (such as .com, net, and .org), the entire site will be categorized with the same label. For instance, if a hypothetical site with the fictional name "www.abcde.com" has as its purpose the teaching of the alphabet and includes pictures as well as audio on its pages, the categorization label for the page "www.abcde-.com" would be "inedviau," which indicates: Information (in); Education & Social Science (ed); Visual (vi); and Audio (au). To make the categorization label "inedviau" for the page "www.abcde.com" applicable to the entire site, an exclamation point is added, such that the categorization label is "inedviau!," which indicates: Information (in); Education & Social Science (ed); Visual (vi); Audio (au); and that the categorization label applies to all pages that contain the root URL www.abcde.com/.

If the categorization label with the exclamation point is placed on a secondary branch of the root URL, the categorization label will apply for all pages that start with that URL. For instance, if a government institution involving medical research has a large number of Web pages containing research papers that are text-only, it could have a root URL such as "www.institution.gov/medical/docs." This root URL could have hundreds of web pages that contain research papers (such as "www.institution.gov/medical/docs/sept" or "www institution. gov/medical/docs/heart"). If the Web page "www.institution.gov/medical/docs" is given the categorization label "ingomete," only that single page would be categorized. If an exclamation point is added, such that the categorization label is "ingomete!," all of the Web pages that contain "www.institution.gov/medical/docs" as part of their URL would be categorized with the same label. Thus, the method does not require the individual categorization of each Web page containing research papers and automatically categorizes new Web pages as they are added.

Level of Importance Given to Each Category

The order that indicia are placed in the categorization label denotes the level of importance of the categories to which a page is assigned. For instance, in the categorization label "inmespvi," which indicates: Information (in); Medical (me); Sports & Recreation (sp); and Visual (vi), the Medical category is given a higher level of importance than the Sports & Recreation category, meaning that the page emphasizes medical content more than sports and recreation content. If the placement of the indicia were reversed, such that the categorization label was "inspmevi," then this would mean that the page emphasizes sports and recreation content more than medical content. This will be reflected in how the search results are displayed. For example, if a searcher selects categories that reflect the categorization label "inmespvi" by clicking on the Medical icon before the Sports & Recreation icon, search results will first list those pages that are categorized with the label "inmespvi" and then list the pages categorized with the label "inspmevi."

Placement of Categorization Label on Web Page

The categorization label is preferably placed, typed, or pasted on the bottom of the page being categorized so that it is the last item on the page. This provides a uniform location for crawlers, spiders, and others to search and read or recognize. Alternatively, the categorization label can be placed in a Metatag.

Automated Reading of Categorization Labels

Using existing technologies known in the art, search engines, Web crawlers, and other automated devices will be able to make the simple programming adjustments needed to read and recognize the categorization labels of Web pages as dictated by each of their individual hardware and software configurations. For example, the search engines may instruct their crawlers to look for the categorization labels in pages that they automatically scan. In most cases, the categorization labels will be found at the end of the page being scanned. The categorization labels will then be read and each category assigned to the page recognized by its two-letter or two-numeral indicium. The URL or another identifier for the page will then be placed in a database under each category and subcategory for which it is categorized.

Method for Searching

The second embodiment of the invention is a method for searching for and locating information on a network. The method allows the user to search pages on a network that have already been categorized into any of three tiers of categories 12, 14, and 16, and copyright-status categories 17. The categorization may have been done by the creator of a page at the time the page was created or during editing at a later time.

Figure 3:
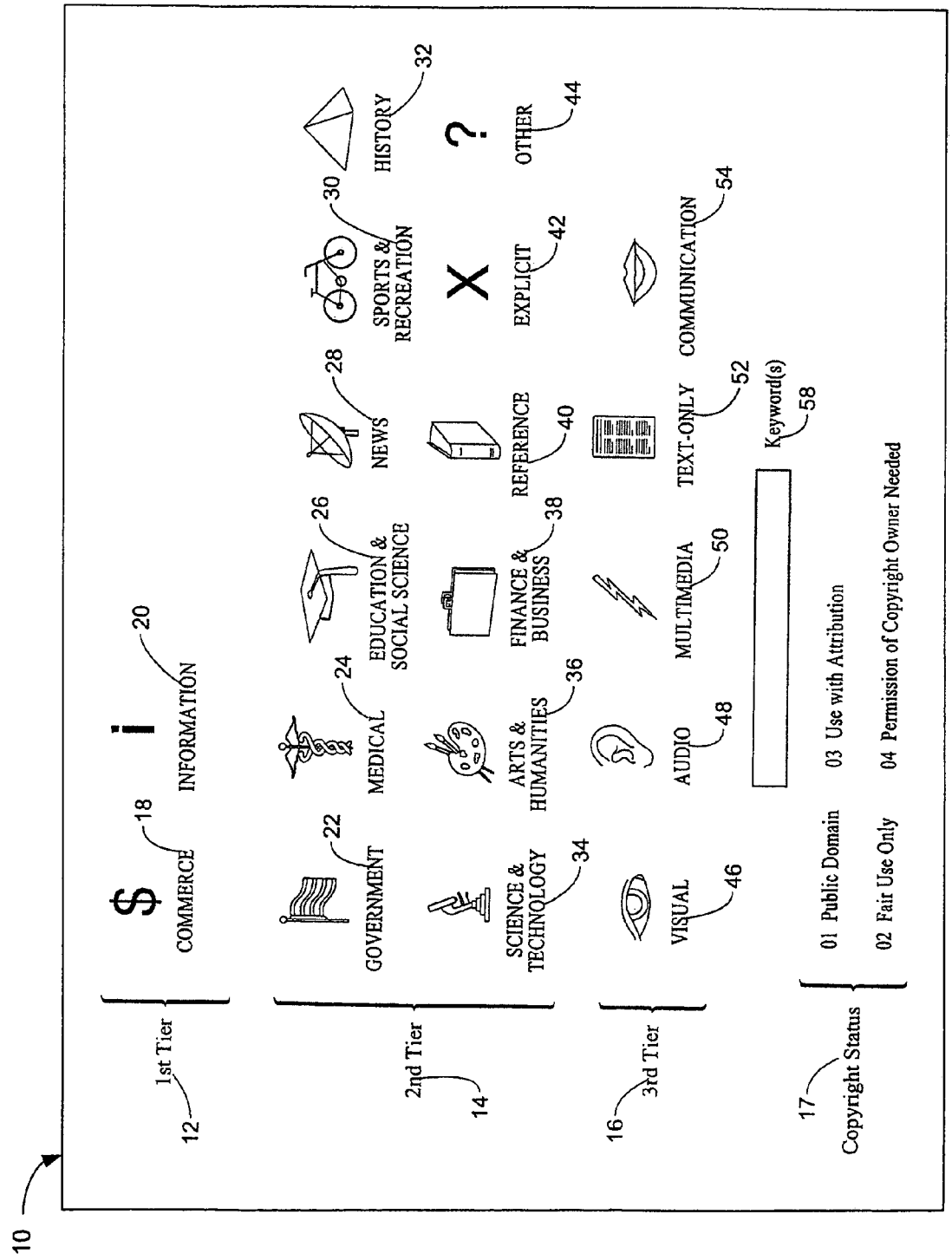
FIG. 3 is a representation of the preferred graphical user interface used for conducting a search.

The method provides the user with the opportunity to limit the search by selecting one or more categories from three tiers 12, 14, and 16, and one of the copyright-status categories 17, and by utilizing a keyword search. A graphical user interface, such as is shown in FIG. 3, may be provided. The user may select one or more categories from each of one, two, or three of the category tiers 12, 14, and 16, and from one or none of the copyright-status categories 17, or from none of tiers 12, 14, and 16 and from one of the copyright-status categories 17, and may or may not use the keyword search function. For convenience, as is well known in the art, when an icon is selected, its appearance may change such that it is emphasized, such as by highlighting.

Figure 4:
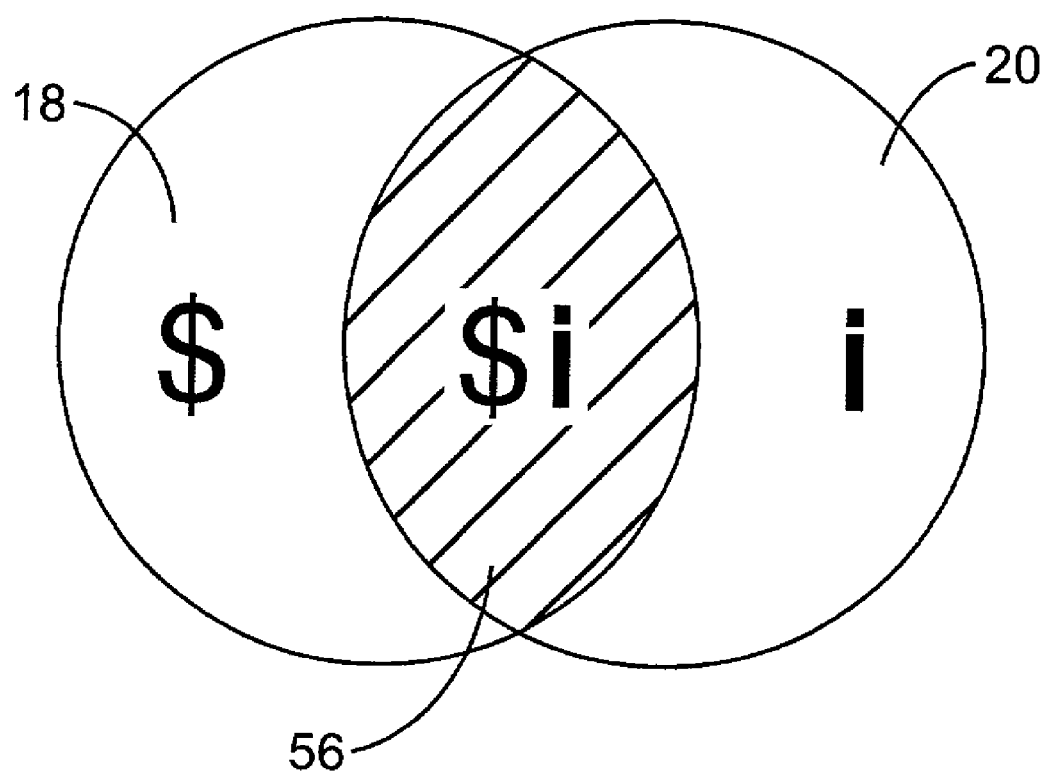
FIG. 4 is a Venn diagram showing the intersection of the domains corresponding to the categories of Commerce and Information.

The user may select, from first tier 12, the category of Commerce 18, the category of Information 20, or both categories 18 and 20. The categories may be conveniently represented on the user's screen by an indicium, for example, as is preferred: "$" for Commerce 18 and "i" for Information 20. If the user selects "$," the search will be restricted to only those Web pages that are categorized as Commerce 18. This will include all pages in the Commerce category 18 as well as the subcategory that is both Commerce 18 and Information 20. Pages only in the Information category 20, and not also in Commerce 18, will automatically be excluded. If the user selects "i," the search will be restricted to only those Web pages that are categorized as Information 20. This will include all pages in Information category 20 as well as the subcategory that is both Information 20 and Commerce 18. Pages only in the Commerce category 18, and not also in Information 20, will automatically be excluded. If the user selects both "$" and "i," as shown in FIG. 4, the search will be restricted to only those Web pages that are categorized as both Commerce 18 and Information 20. Only subcategory 56 of Commerce and Information will be searched. Pages only in Commerce 18 and pages only in Information 20 will be excluded. If none of the categories of first tier 12 are selected, the search results will include Web pages of both categories and the subcategory and will not be narrowed based on whether the page is involved in transacting business or providing information.

The user next may select one or more categories from second tier 14: Government 22, Medical 24, Education & Social Science 26, News 28, Sports & Recreation 30, History 32, Science & Technology 34, Arts & Humanities 36, Finance & Business 38, Reference 40, Explicit 42, and Other 44. As shown in FIG. 3, each of these twelve categories may be conveniently represented on the user's screen by a different indicium, for example, as is preferred: a flag for Government, a caduceus for Medical, a mortarboard for Education & Social Science, a satellite dish for News, a bicycle for Sports & Recreation, a pyramid for History, a microscope for Science & Technology, an artist's pallette for Arts & Humanities, a briefcase for Financial, a book for Reference, an "X" for Explicit (pornographic or sexually-explicit material), and a "?" for Other. A list of sample topics included in each category may be provided to the user who may view the list by, for example, clicking on the icon for the category. The twelve subject matter categories and their corresponding topics are shown in FIGS. 5, 6, and 7. If none of the categories are selected, the search results will include Web pages of all twelve categories and will not be narrowed based on the subject matter contained in the page.

Next, the user may select one or more categories from third tier 16: Visual 46, Audio 48, Multimedia 50, Text-only 52, and Communication 54. As shown in FIG. 3, each of the five categories may be conveniently represented on the user's screen by a different indicium, for example, as is preferred: an eye for Visual, an ear for Audio, a lightning bolt for Multimedia, a text page for Text-only, and a mouth for Communication. If no selection is made from this tier, the results from the search will include Web pages that are associated with file-types of text, visual, audio, multimedia, and communications and will not be narrowed based on the types of files contained on the page.

Then, the user may select one of the copyright-status categories 17: Public Domain, Fair Use Only, Use with Attribution, and Permission of Copyright Owner Needed. As shown in FIG. 3, each of the four categories may be represented on the user's screen by a different indicium, such as a two-numeral indicium as is shown. If none of the categories are selected, the search results will include Web pages of all four categories and will not be narrowed based on the copyright-status of the material on the page.

Combining categories restricts the search results to only the relevant categories and subcategories. The greater the number of categories chosen, the more refined the search and the greater the number of pages that are excluded from the search. When the user selects several categories, the user does not get results from each of those categories, but only from the subcategory that is created from the combination of the selected categories. Combining categories acts as a filtering process, eliminating irrelevant material from the search and from subsequent results. This method allows the user to exclude unwanted material, such as pornography, which is contained in Explicit category 42.

The user may next enter a keyword 58, which can be a single word or multiple words. The keyword search can be formulated by using either Boolean logic terms or natural language.

Figure 8:
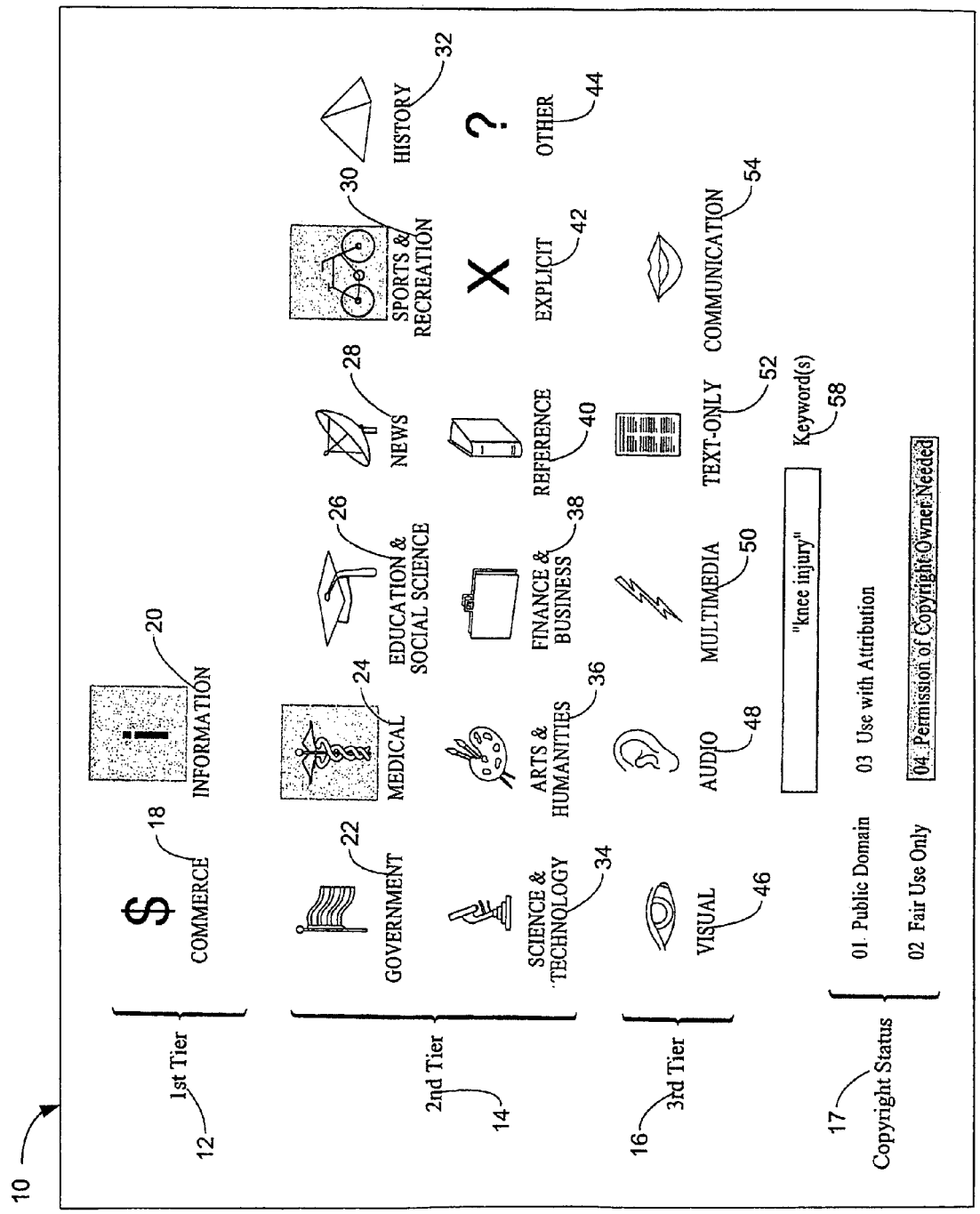
FIG. 8 shows an example of the preferred graphical user interface for a search
Figure 9:
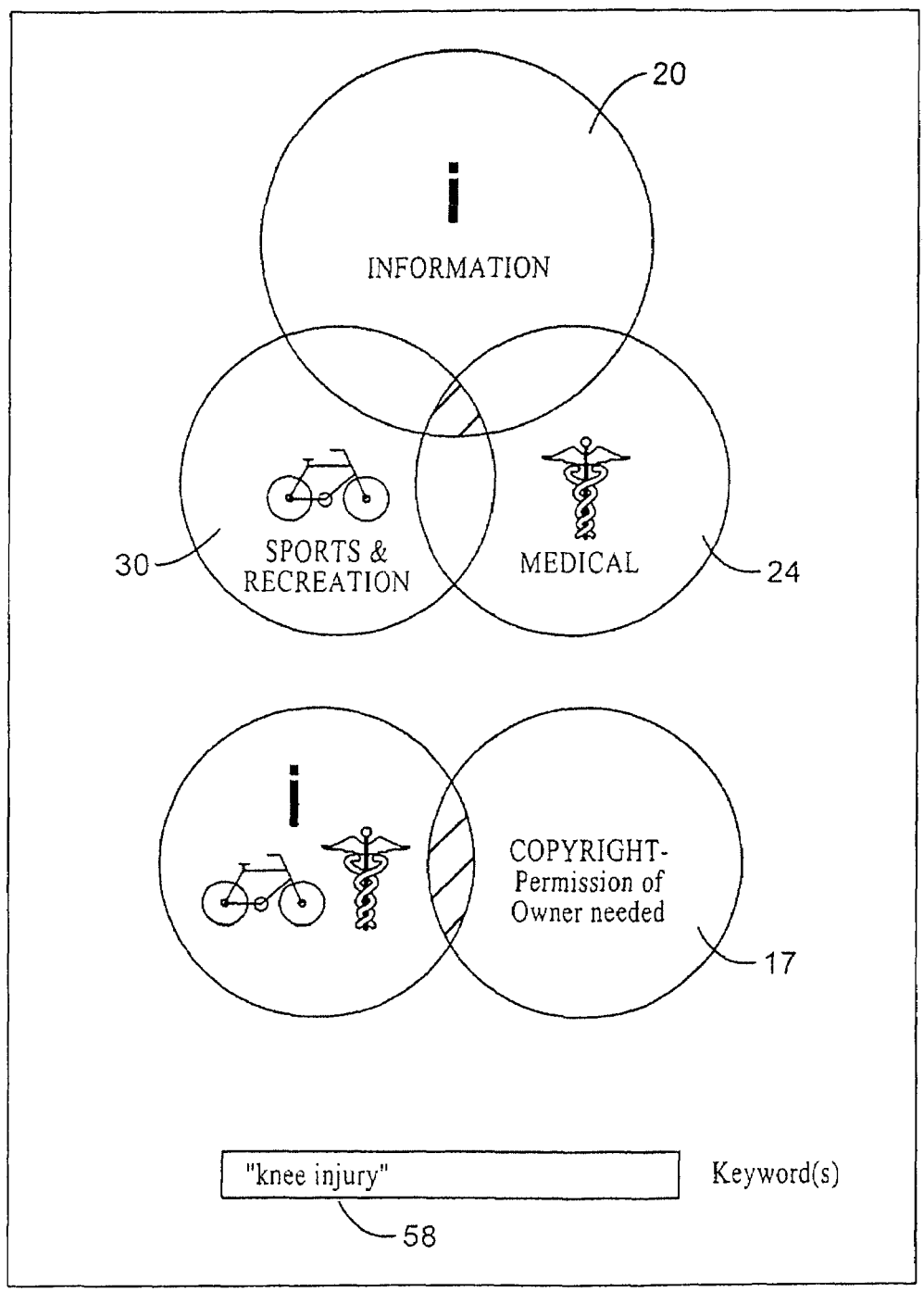
FIG. 9 is a Venn diagram showing an example of the relationship between the subcategory created by selecting a combination of the categories and the keyword search.

For example, a searcher who wanted to find information on sports-related knee injuries that could be used with the permission of the copyright owner would make the selections shown in FIG. 8. By selecting the combination of the Information, Medical, and Sports & Recreation categories, as well as the category that contains Permission of Copyright Owner Needed, the search and subsequent search results will be limited to the subcategory shown in FIG. 9 and will not include pages and sites from the larger Information, Medical, Sports & Recreation, and Permission of Copyright Owner Needed categories that are not contained within the much smaller subcategory.

After making the selections, the user initiates the search. The indicia for the categories selected and the keyword preferably remain visible on the user's screen during the search.

After a user initiates a category-limited search, existing technologies known in the art will allow an identification to be made of all pages that have been assigned to all of the categories to which the search was limited. This may be accomplished by a search engine reviewing a database corresponding to a subcategory that is equal to the combination of categories selected by the user. If the search has been limited using keyword, an identification is made of all pages containing the keyword. If the search is both category-limited and keyword-limited, an identification is made of all pages that have been assigned to all of the categories to which the search was category-limited, which also contain the keyword.

Searchers will also be able to make use of the categorization code by treating the categorization label as a keyword element in combination with actual keywords. For instance, by treating the categorization label "ingovi" as a keyword and combining it with the keyword "Pentagon," using the Boolean qualifier "AND" to search "ingovi" AND "Pentagon," the searcher would receive results from the subcategory created by the combination of the Information, Government, and Visual categories that also contain the keyword "Pentagon."

Existing technologies known in the art will allow all sites identified by the search to be reported as search results to the user, by network address, such as a Web page's "uniform resource locator" (URL), so that the user can access any identified page. Other information, such as the first line, may also be reported. For each site reported, the results may show all of the indicia corresponding to all of the categories to which that page had been assigned.

Searches for pornographic sites will be handled in the same manner as other searches with one exception: The Explicit category is not combinable with any other second tier category. Also, search engines can be instructed to exclude from the search results pages contained in the Explicit category if desired by the user. The user is also provided with the option to exclude the indicium for the Explicit category from the user interface. This will serve two purposes. It will eliminate the category from search use and it will also remove any indication alluding to the access of pornographic or sexually explicit material. Other types of sexually explicit material, which may be appeared in information related to medical studies and scientific research, and material related to pornography which may be appeared in information related to governmental initiatives and news, may be accessed through the other categories of second tier 14 using "pornography" as a keyword.

The foregoing detailed disclosure of the inventive method is considered as only illustrative of the preferred embodiments of, and not a limitation upon the scope of, the invention. Those skilled in the art will envision many other variations of the method disclosed that nevertheless fall within the scope of the following claims. Alternative uses for this inventive method may later be realized. Accordingly, the scope of the invention should be determined with reference to the appended claims and not by the examples that have been given.

The invention claimed is:

1. A computer implemented method of categorizing a network page, comprising:
providing a list of categories, wherein said list of categories include a category for transacting business and a category for providing information, and wherein said list of categories include a category based on copyright status of material on a page;
assigning said network page to one or more of said list of categories;
providing a categorization label for the network page using the copyright status of material on the network page; and
controlling usage of the network page using the categorization label and the copyright status of the network page.

2. The method of claim 1, wherein said categories include a plurality of categories based on subject matter.

3. The method of claim 2, wherein said categories comprise categories related to government, medical, education and social science, news, sports and recreation, history, science and technology, arts and humanities, finance and business, reference, and explicit.

4. The method of claim 1, wherein said categories include a plurality of categories based on the type of files associated with a page.

5. The method of claim 4, wherein said categories comprise visual, audio, multimedia, text-only, and communication.

6. The method of claim 1, wherein said plurality of categories based on the copyright status of material on a page comprise categories related to public domain, fair use only, use with attribution, and permission of copyright owner needed.

7. The method of claim 1, wherein said categories include:
a plurality of categories based on subject matter.

8. The method of claim 1, wherein said categories include:
a plurality of categories based on the type of files associated with a page.

9. The method of claim 1, wherein said categories include:
a plurality of categories based on the copyright status of the material on a page.

10. The method of claim 1, wherein said categories include:

a plurality of categories based on subject matter; and a plurality of categories based on the copyright status of the material on a page.

11. The method of claim 1, wherein said categories include:

a plurality of categories based on subject matter; and a plurality of categories based on the type of files associated with a page.

12. The method of claim 1, wherein said categories include:

a plurality of categories based on subject matter; and a plurality of categories based on the copyright status of the material on a page.

13. The method of claim 1, wherein said categories include:

a plurality of categories based on subject matter;

a plurality of categories based on the type of files associated with a page; and a plurality of categories based on the copyright status of the material on a page.

14. The method of claim 1, wherein said categories include:

a plurality of categories based on the type of files associated with a page; and a plurality of categories based on the copyright status of the material on a page.

15. The method of claim 1, wherein said categories include:

a plurality of categories based on subject matter;

a plurality of categories based on the type of files associated with a page; and a plurality of categories based on the copyright status of the material on a page.

16. The method of claim 1, further comprising providing an indicium for each of said categories.

17. The method of claim 16, wherein said indicium comprises an icon.

18. The method of claim 16, wherein said indicium comprises two letters.

19. The method of claim 1, further comprising providing a categorization code that can be used to label the page with the categorization label that indicates the categories to which the page is assigned.

20. The method of claim 19, wherein said categorization code comprises an indicium for each of said categories.

21. The method of claim 20, wherein said indicium comprises two letters.

22. The method of claim 20, wherein said categorization label includes the indicia for each category to which a page is assigned.

23. The method of claim 19, wherein said categorization label denotes the level of importance of the categories to which a page is assigned.

24. The method of claim 23, wherein said categorization label is recognizable by a search engine.

25. The method of claim 19, wherein said categorization label further includes an identifier to indicate that said label is part of said categorization code.

26. The method of claim 19, wherein said categorization label can be made to apply to an entire Web site.

27. The method of claim 19, further comprising making said categorization label recognizable by a search engine.

28. The method of claim 1, further comprising making said categories to which a page is assigned recognizable by a search engine.

29. The method of claim 1, wherein said list of categories is provided on a graphical user interface.

30. A computer implemented method for categorizing a network page, comprising:

providing a list of categories, wherein said list of categories include a category for transacting business and a category for providing information, and wherein said list of categories include a plurality of categories based on the copyright status of material on a page;

providing a categorization code for labeling the network page with a categorization label, wherein said categorization label indicates a set of categories and subcategories to which the network page is assigned, and wherein said categorization label indicates the copyright status of material on the network page; and controlling usage of the network page using the categorization label and the copyright status of the network page.

31. A computer implemented method of categorizing a network page, comprising:

providing a list of categories, wherein said categories include a category based on the copyright status of material on a page, and wherein the copyright status comprises categories related to public domain, fair use only, use with attribution, and permission of copyright owner needed;

assigning said network page to one or more of a plurality of said list of categories;

providing a categorization label for the network page using the copyright status of material on the network page; and controlling usage of the network page using the categorization label and the copyright status of the network page.

* * * * *